Figure 1:
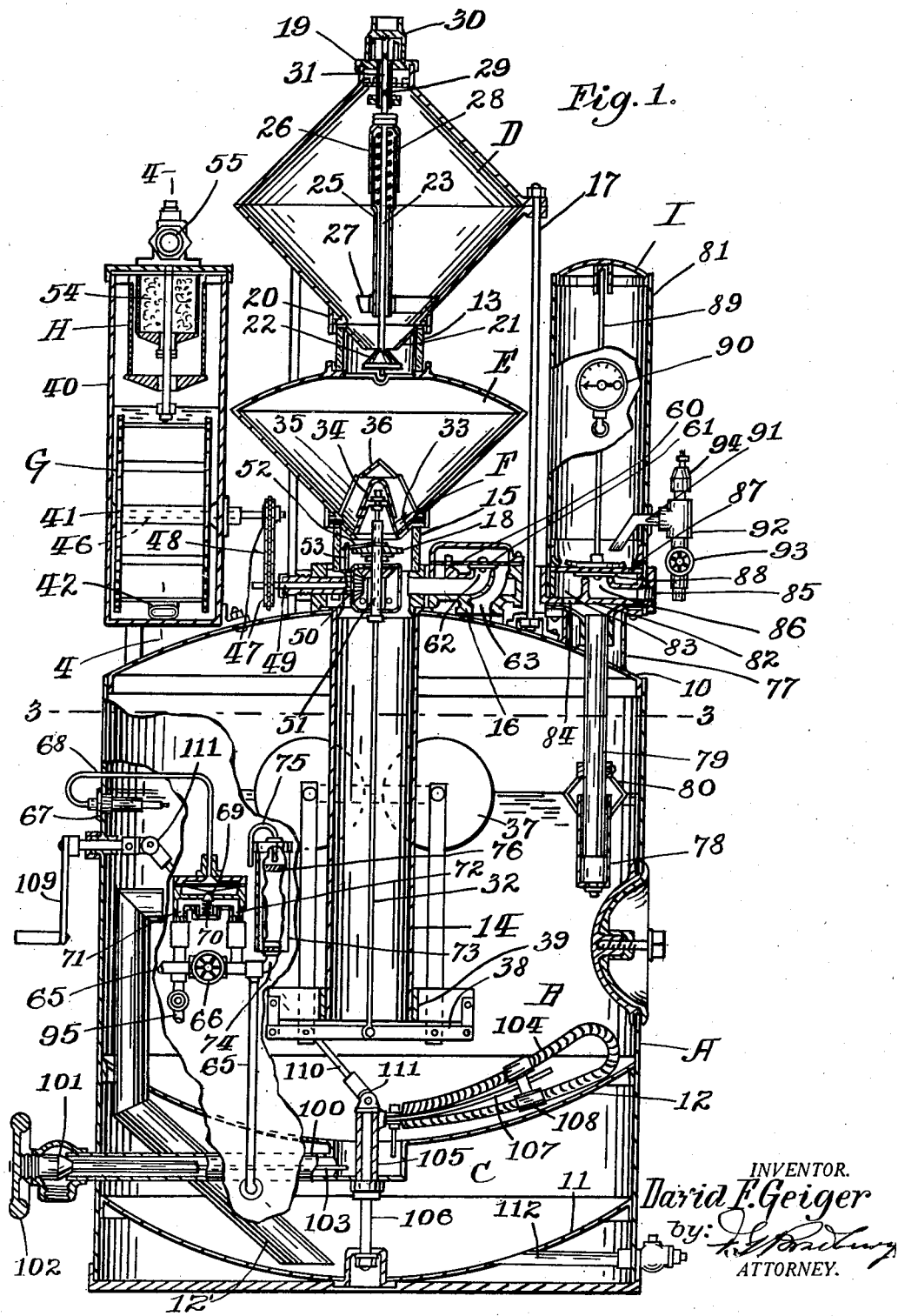

June 4, 1940.   D. F. GEIGER   2,202,847
ACETYLENE GENERATOR
Filed Aug. 23, 1937   5 Sheets-Sheet 1

INVENTOR.
David F. Geiger
by:
ATTORNEY.

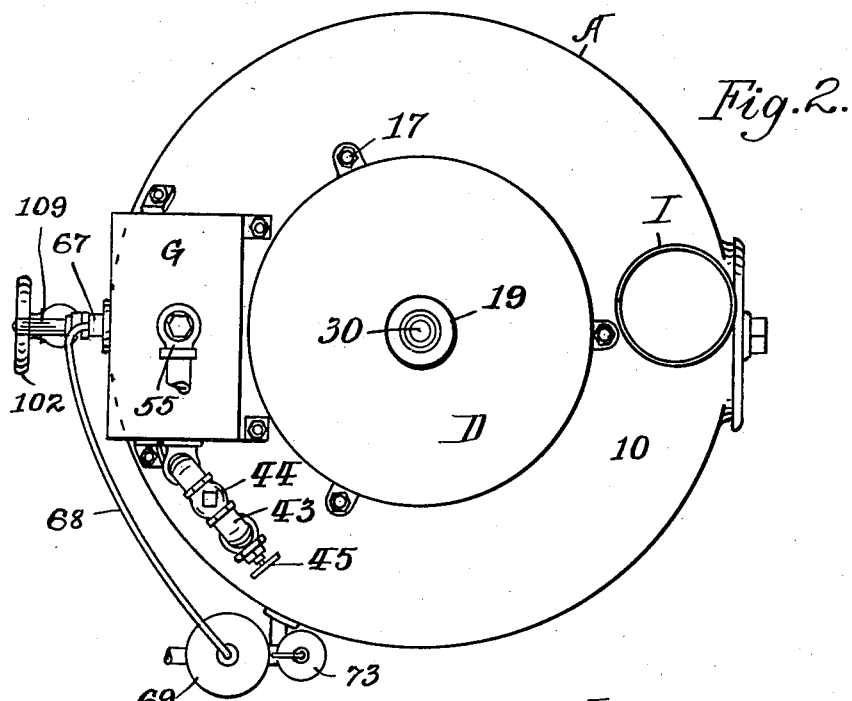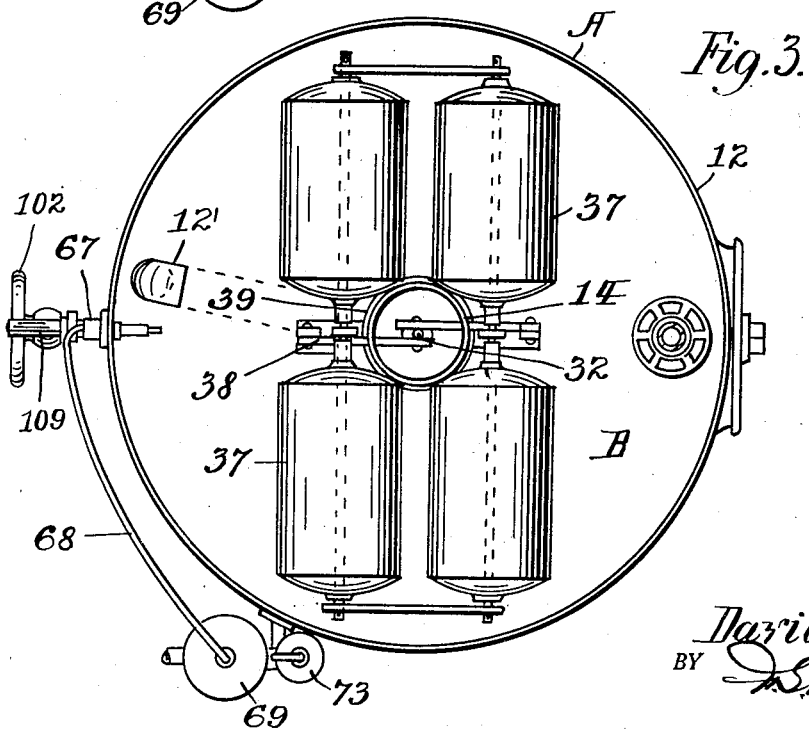

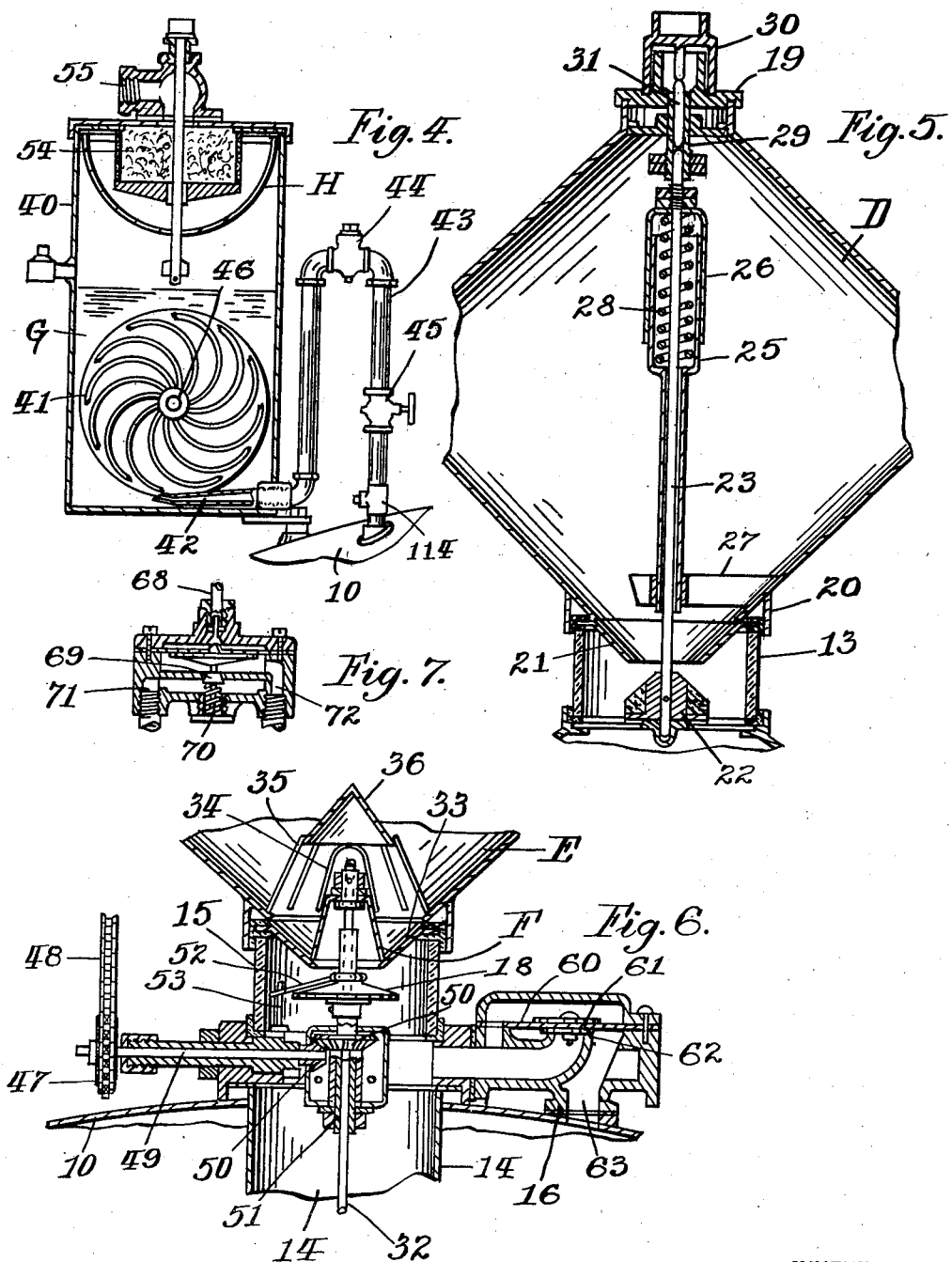

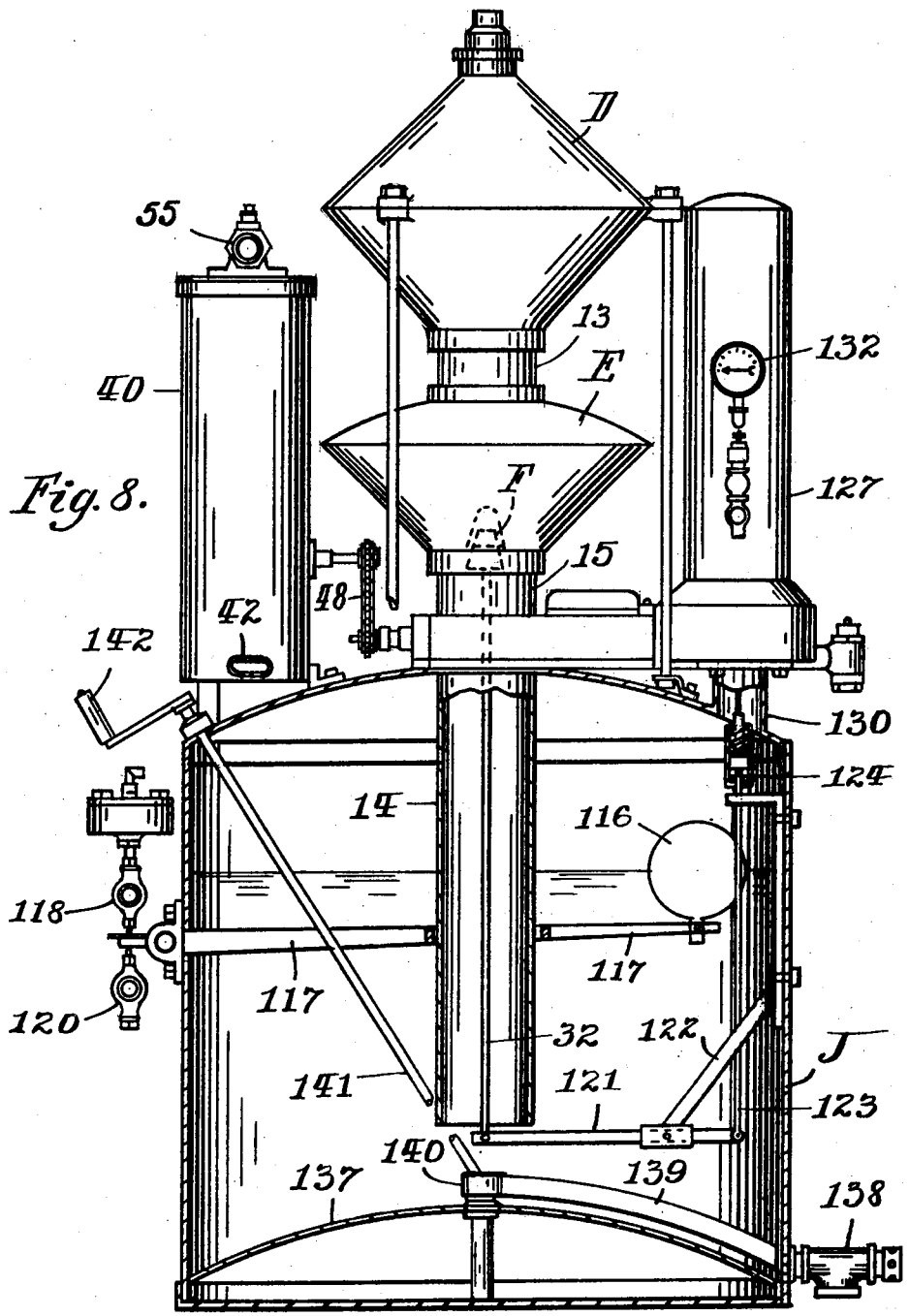

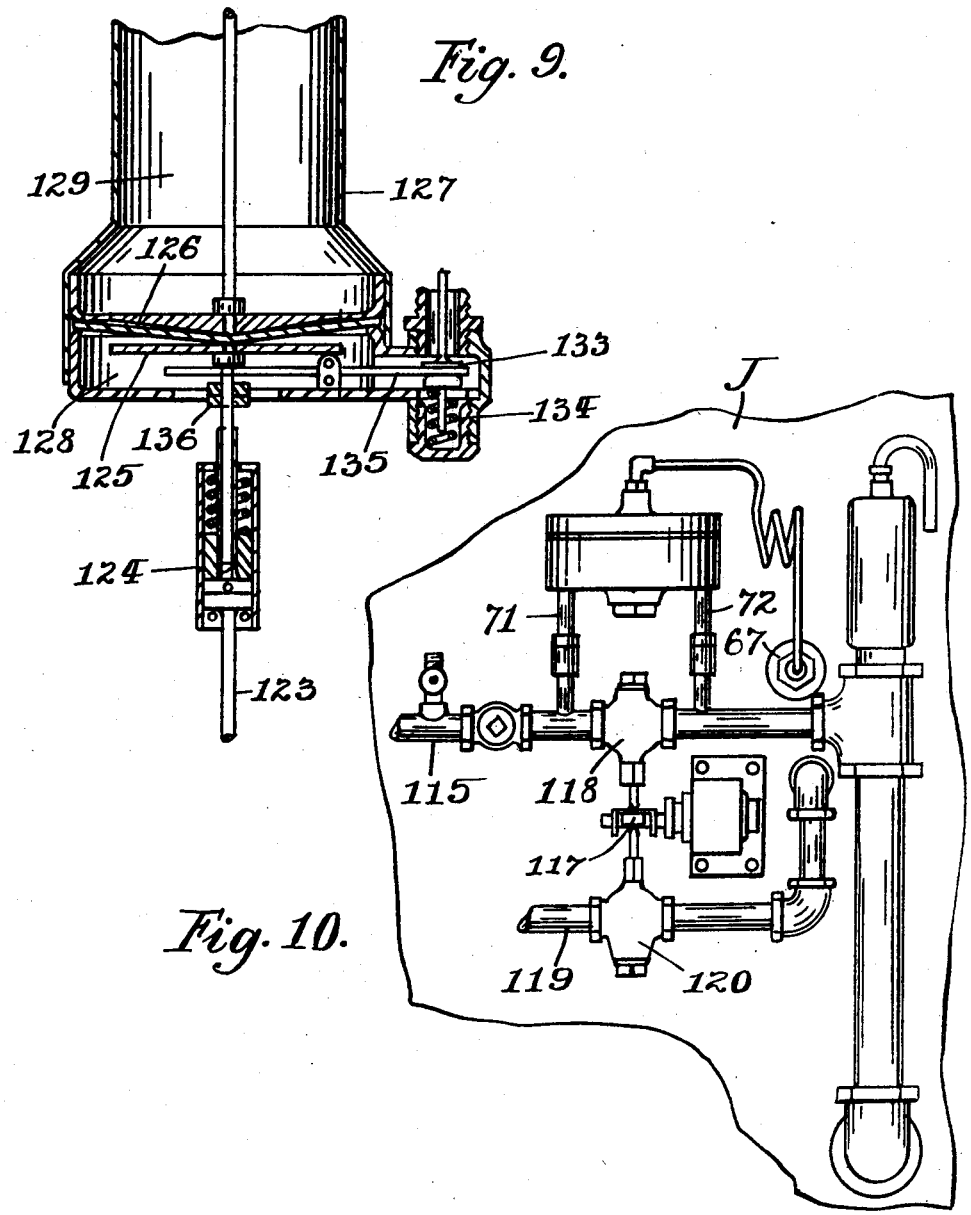

Patented June 4, 1940

2,202,847

UNITED STATES PATENT OFFICE 2,202,847

ACETYLENE GENERATOR

David F. Geiger, Los Angeles, Calif., assignor of one-half to Carl J. Nyquist, Los Angeles, Calif., and one-half to Rudolph Shuhart, Summit City, Calif.

Application August 23, 1937, Serial No. 160,489

8 Claims. (Cl. 48—38)

This invention relates to an acetylene generator of that type employing the "carbide to water" principle and by which gas is generated automatically as used.

The primary object of my invention is the production of an acetylene generator which is particularly adapted for the production of acetylene from carbide, such as is used for operating welding and cutting torches, lighting, power, storage and any other purpose desired. A further object is the production of an acetylene generator which is safe, efficient, effective, less expensive to operate and more economical in the production of acetylene than heretofore.

Among the advantages attained by my invention are the following:

The production of an acetylene generator by which a constant pressure of gas is produced, in which air is excluded at all times from mixing with the gas, and having dependable automatic feed for the carbide, whereby acetylene is efficiently, effectively and safely produced without objectionable fluctuation in gas pressure.

The prevention of loss of gas in the generator when recharging with carbide and water, resulting in greater economy and safety.

The production of a generator capable of continuously supplying gas for any service desired, thereby eliminating the necessity for installing one or more additional generators where a larger supply of acetylene is required either temporarily or regularly.

The production of as nearly pure acetylene as possible and to eliminate the risk of acetylene and air mixture in any part of the generator at all times.

The effective prevention of feeding carbide and generation of gas as soon as gas service is discontinued.

The provision of a temperature control, thereby eliminating an undesirable temperature rise of water and gas in the generator.

The control of gas pressure in the generator at any desired working pressure.

The provision of means by which recharging of the generator with carbide and water can be effected without interruption or the fluctuation of the generator while producing gas.

Provision of gas pressure in a dual feed for the carbide into the machine, controlled by the volume and pressure of gas produced, whereby greater precision in feed and control of pressure and amount of gas is accomplished.

The production of a generator in which the carbide is fed to the coolest part of the water in the generator chamber resulting in cool generation of pure gas.

The prevention of the generation of gas by the generator without the required amount of water in the generating chamber.

The provision of means for removing the sludge rapidly and effectively without interrupting the efficient generation of gas.

And the provision of means for loosening and breaking up sludge incrustation whereby sludge can more effectively egress without interrupting the operation of the generator.

With these and other objects in view and advantages attained, my invention comprises the features of construction and combination of parts hereinafter described and claimed.

In the accompanying drawings forming part of this specification, Figure 1 is a vertical central section of my improved acetylene generator; Fig. 2 is a plan of the structure shown in Fig. 1; Fig. 3 is a horizontal section taken on the line 3—3 of Fig. 1; Fig. 4 is a vertical section of the feed motor and gas washer and scrubber taken on the line 4—4 of Fig. 1, and showing a typical view of the gas connection; Fig. 5 is an enlarged vertical section of a detail showing a portion of the carbide filling hopper; Fig. 6 is an enlarged vertical section of a detail showing the carbide feed mechanism; Fig. 7 is an enlarged vertical section of a detail showing the heat control valve; Fig. 8 is a vertical central section of an alternative construction of my improved generator, the feed motor, scrubber and the master valve control being shown in full; Fig. 9 is a vertical section of a detail showing the master feed control, and Fig. 10 is an elevation of a detail of the generator tank showing the heat and water control equipment.

Generator tank

My improved acetylene generator employs a relatively large cylindrical tank A, having a crowned top 10, a dished bottom 11, and a dished horizontal partition 12 which is placed at about one fourth of any suitable height above the bottom whereby two separate compartments are provided. Normally about two thirds or any suitable portion of the upper compartment B is filled with water or other suitable liquid, the remaining space serving as a gas storage chamber. The lower compartment C is partly filled with water when the generator is in operation, the remaining space containing trapped air. The function of this lower compartment is to serve as a gas opposing or pneumatic compensating chamber to regulate the water level in the upper or gas storage chamber through a suitable by-pass duct 12', without any possibility of air contacting and mixing with the gas which is generated.

Carbide charging and feeding

Above the generator tank are superimposed two carbide hoppers D and E, the two hoppers being connected by a transparent sight tube 13 and the lower hopper being connected with a downwardly extending gas generating tube 14 through a transparent feed tube 15, and housing 16, said gas generating tube and housing being mounted upon the top of the tank in which the carbide drops upon water therein and generates gas. These sight tubes permit observation of the carbide flow from the upper to the lower hoppers and from the lower hopper into the feed tube. They also enable the operator to determine when the upper hopper is emptied and requires refilling with carbide. The hoppers are secured to the top of the tank by any suitable means such as the bolts 17 and the sight tubes are tightly connected in suitably gasketed seats which produce gas tight joints, said bolts serving to tightly draw and hold the parts together. The tank, hoppers and other parts are designed so as to be easily galvanized or otherwise corrosion proofed before they are assembled. The lower feed hopper E which is adapted to receive carbide from the upper hopper has a feed table in the form of a horizontal rotary disk 18 located in the lower sight tube 15 or throat and the lower outlet end of the hopper terminates immediately above the surface of the disk so that carbide will be gradually fed from the hopper and drop upon water contained in the gas generating tube 14 as the feed is automatically controlled and regulated by the flow of gas generated by the machine. Carbide in small broken condition is placed in the upper charging hopper D through an opening which is closed by a removable cap 19. The lower end of the charging hopper is tightly sealed in a collar 20 in which the upper end of the sight tube 13 is also held. Secured between the lower end of charging hopper D and the sight tube 13 in a gasketed seat is a conical extension 21 of the hopper, the lower end of which forms a valve seat with which the valve 22 cooperates to automatically close the transfer duct between the charging and feed hoppers during replenishment of carbide in the charging hopper so that air is excluded from the feed hopper and the operation of the machine during recharging is uninterrupted.

Valve 22 is carried by the lower end of a reciprocable valve rod 23 which is held from lateral displacement in the lowered open position of the valve by a skeleton support. This valve rod extends upwardly through a pair of telescoping tubes 25 and 26, the lower member of which is held rigidly by a skeleton support 27 and the upper member is secured to the valve rod. Between the telescoping members is placed a helical expansion spring 28 the object of which is to thrust the valve rod up and close valve 22 upon its seat. The upper end of the valve rod slides freely in a cylindrical sleeve 29 depending from the filling cap 19 and extending slightly above said cap. The upper end of said sleeve is adapted to be closed by a sealing cap 30. A push pin 31 inserted loosely in the sleeve acts to depress the valve stem and open the valve 22 when the filling cap is secured over the upper end of the sleeve. Thus the charging hopper and its valve serve to prevent loss of gas and to exclude air from the generator during the recharging operation.

Dual carbide feed

Placed in the lower end of the feed hopper and immediately above the feed disk 18 is a carbide feed valve F (see Fig. 6), which resembles a conical shell mounted by its upper open end on a thrust valve stem 32 and placed so that its lower base end in lowered position will seat upon and close the lower open end of the downwardly tapering extension 33 of the lower open end of feed hopper E. An upwardly tapering cap 34 placed over the upper end of master valve F protects it from the carbide and a grill 35 having cap 36 also relieves and protects the valve from the weight of the carbide without obstructing the feeding function. The master carbide feed valve F is controlled automatically by the height of liquid held in the upper gas generating chamber B, the water level being caused to rise due to diminished gas pressure above it and the consequent action of a float. The valve operating means consists of a plurality of air tight float tanks 37 connected by a suitable system of levers 38 mounted upon a support 39 which is carried by the lower end of the depending gas generating tube 14 and pivotally connected with the lower end of the valve stem 32 so as to actuate the valve automatically by the up and down movement of the floats.

This carbide feed control by means of master valve F operates in conjunction with the feed table 18 which in turn is revolved at a speed in direct proportion to the amount of gas which is delivered by the machine through a feed motor G. This motor consists of a housing 40 secured to the top of tank A, containing a freely rotatable rotor 41 against the propeller blades of which a gas injecting nozzle 42 is directed (see Fig. 4). The feed motor housing is partly filled with a liquid in which the rotor is submerged and the nozzle is connected through an elbow duct 43 containing check valve 44 and hand operated valve 45 with the cover 10 of chamber B. Motion is transmitted from the rotor by its shaft 46, sprockets 47 (see Fig. 1), chain belt 48, shaft 49, intermeshing miter gears 50 (see Fig. 6), and rotary sleeve 51 to the feed table 18. The sleeve 51 is threaded freely over the valve stem 32 and is stepped freely to revolve in the valve fitting 16. The gas which is projected by nozzle 42 displaces some of the liquid in the rotor compartments thus causing the rotor to revolve at a speed in direct proportion to the gas which is produced by and consumed in service. This motion is transmitted to the feed table 18. Thus the feed of carbide onto the feed table is controlled by the height of liquid and the pressure of gas in compartment B cooperating with the speed of rotation of the feed table produced by the outflow or volume of gas from the motor chamber and used in service. The feed table is shown slightly conical to allow free release of the particles of carbide dropping on it and placed above its surface is a scraper 52 (see Fig. 6), which is held stationary by the rigid arm 53 so as to guide the carbide from the feed table and cause it to drop into the water contained in the gas generating tube 14. The object of the gas generating tube is to cause the carbide to drop into the coolest part of the water at the bottom of compartment B, thus equalizing the temperature of the water and washing the gas by causing it to pass upwardly outside of the tube through a large volume of water. Thus also the smallest particles of carbide yield gas instead of, as in ordinary types of acetylene generators the carbide accumulates on the surface of the water and produces hot and incomplete gas generation, undue heating of water and impurities in the carbide passing with the gas into the service line.

Gas dryer and scrubber

In the upper part of the motor housing 40 is placed a gas dryer or scrubber H which is filled with steel wool 54 or other suitable material, the purpose of which is to clean and dry the gas passing through it and out through the main egress duct 55. The scrubber is designed to permit easy filling or removal of the contents for cleaning.

Water level control

The valve housing 16 contains a by-pass diaphragm valve 60 which functions automatically and serves to prevent water level in the gas generating tube 14 from rising higher than the water level in the gas generating compartment B, thereby eliminating the chance of the water in the tube entering the carbide hoppers in case of a leak in the tube or the hoppers. The by-pass is placed on the top of tank A and connects the upper part of tube 14 with the upper part of compartment B. On its lower side it has a soft composition seat 61 which contacts the valve seat 62 when the valve closes. This diaphragm relief valve is of sufficient size to quickly open the valve seat 62 and passage 63 entering the tube 14 and chamber B if at any time the gas pressure in compartment B should momentarily exceed the pressure in tube 14. The gas entering the by-pass valve through inlet 63 lifts diaphragm valve 60, thereby opening the valve and permitting the flow of gas into the tube and consequently forcing down the water level in the tube. In effect this is a balanced controlled valve which prevents the abnormal rise of liquid above that in the gas generating chamber B.

Water temperature control

To maintain the water in the generator at a low temperature cold water or other suitable liquid is admitted to the generator tank through a supply pipe 65 leading from a suitable service supply into the lower chamber C and controlled by a hand valve 66. The heat control by-passes around the hand valve and is automatically operated through the liquid control thermostat 67. This thermostat is connected by duct 68 with the diaphragm controlled valve 69 (see Fig. 7), the latter being held normally closed by a spring 70, and through its functioning opening by-pass ducts 71 and 72, thus admitting water at reduced temperature automatically into the tank whenever a rise in temperature causes the thermostat control to function.

An air trap 73 (see Fig. 1), serves to separate and remove any air which might be present in the water line. It consists of a small tank having an inlet connection 74 from the water line and an outlet 75 at its top. Inside is an air tight float 76 provided with a seat at its upper end which closes against the outlet 75. If air enters the trap the float drops and allows air to escape. When the trap is filled with water, the float rises closing the outlet. This air trap also acts to clean air when air is injected into the tank for cleaning purposes as will be hereinafter described.

Water level control and safety valve

To maintain the correct water level and to release pressure of gas and water in compartment B, I provide a combined control and safety valve I which is mounted upon a tube 77 connected to the top of tank A and containing a vent duct 78 extending down below the normal level of water in compartment B. The lower end of the vent tube is water sealed by an outer tube 79 spaced slightly therefrom, leaving a passage for sealing liquid between them and secured to the vent tube at selected elevation by the grating 80 or other attaching means. The combined control and safety valve has a small tank 81 which carries a fitting 82 on its lower end, said fitting containing a valve chamber 83 with which the vent tube is connected, through an ingress port 84. The valve chamber has a threaded outlet 85 leading outside and terminating in an upwardly extending centrally disposed valve seat 86. The lower portion of the tank is separated into two tightly sealed compartments by a diaphragm 87 which carries a valve 88 on its lower side, said valve when pressed down by pressure on its upper side being adapted to close over the valve seat. A thrust shaft 89 attached to the diaphragm plays freely in the head of the tank. The tank is filled with water sufficient to exert a predetermined pressure as indicated by the gauge 90. When the generator operates any difference in gas pressure in the gas chamber B is continuously balanced against the diaphragm 87. The pressure in tank 81 is set at any desired degree by the amount of water placed in tank 81. Simultaneously while the regulating valve 88 functions to control the water level in chamber B, the carbide feed and gas generation are automatically and accurately controlled at the required working pressure.

Above the diaphragm 87 and secured to tank 81 is a pipe fitting 91, to which on the outside of tank 81 is connected a T fitting 92 which on one end is a valved coupling 93 and on the other end an automatic pressure release or blow off valve 94 which is set to release at a predetermined pressure in tank 81. To set the control valve to a desired working pressure a service hose or other duct is connected to valved coupling 93. The other end of the service connection is coupled to valved supply duct 95 leading from the water line 65. By opening valved supply 95 and valved coupling 93, water from the water line is forced into tank 81 thus compressing air in the top portion of the tank until the desired pressure is shown on gauge 90. Both valves are then closed and the connection removed. If it is desired to lower the working pressure, valve coupling 93 is opened and water from tank 81 discharged until the desired pressure is shown on gauge 90.

Removal of sludge

The lime and impurities deposited on the bottom 12 of the gas generating compartment B and tending to form into incrustation are removed through a sludge duct 100 from the generator. A valve 101 operated by hand wheel 102 serves to open or close the duct and an agitating arm 103 extending longitudinally through the duct and secured to the valve serves by the revolution of the hand wheel to rid the tube of objectionable deposit which may tend to pack in the duct. To free and break the sludge which collects on the bottom 12 of the gas generating compartment I provide a swinging flexible arm composed of a spring coil 104 having its ends flexed and secured to a vertical revoluble sleeve 105 which is journaled upon a vertical shaft 106. This shaft is mounted centrally upon the bottom 12 of chamber B and the bottom 11 of chamber C. A rod 107 radiating from the sleeve assists in transmitting rotary motion from the sleeve to the flexible arm, being attached thereto by the fitting 108. The revolution of the sleeve and its arm is actuated by the handle 109 journaled on the side of the tank and connected to the sleeve by the shaft 110 and universal joints 111. The natural tendency of the sludge is towards the center of the bottom 12 of the tank where it enters the sludge duct 100. Removal of the sludge is further facilitated by introducing water under pressure into the generating chamber by opening valve 66. The valved duct 112 into the bottom of compartment C enables draining of water and the flexibility of the arm formed by the coil 104 permits the arm to sweep freely over the by-pass duct 12 during its revolution.

*Operation*

To start operation, the motor housing 40 is filled with light lubricant or any other suitable liquid until rotor 41 is completely submerged. The generator tank A is filled with water by removing overflow plug 114 and connecting supply duct 65 with a suitable supply of water and opening hand valve 66. Thus water is caused to flow into the lower part of chamber C leaving the upper part filled with trapped air. Additional water is forced through by-pass duct 12 thus filling compartment B until water escapes through the overflow opening. Hand valve 66 is then closed and the overflow plug replaced. This procedure excludes all air from compartment B. Next the valved water supply 95 is connected with valved coupling 93 and their valves opened thus forcing water into the bottom part of tank 81 of the control and safety valve. This forces water into the bottom part of tank 81 and compresses the air above the water in the top part of the tank. Gauge 90 will then register the pressure of the trapped air in the tank. Valved ducts 66 and 93 are closed as soon as the desired working pressure is indicated by gauge 90 and the connections therebetween disconnected.

Next charging hopper D is filled with ground carbide by removing caps 19 and 30. The caps are then replaced which operation opens valve 22 and allows carbide to flow into lower feed hopper until the latter is filled. The caps are then again removed and the charging hopper refilled. After refilling the caps are again replaced. This filling process excludes substantially all air from the hoppers leaving the hoppers free to perform their functions automatically.

Next carbide is fed by operating the feed mechanism for a short time by hand during which time a small amount of gas is developed by the generator which is sufficient to continue the operation automatically. This hand operation is performed by pulling the sprocket chain 48 a few turns which will rotate the feed table 18 and cause carbide to drop into the water contained in the generator tube 14. The gas thus generated forces down through the tube and collects in the top of the gas generating chamber B. By opening valve controlled service duct 45 the gas thus generated will escape through the rotor 41 and scrubber H and cause the rotor to revolve and feed more carbide from the feed plate automatically thus building up the desired working pressure of gas in the gas generating chamber B.

The first carbide fed from the rotary feed plate 18 drops in water in the top portion of the gas generating tube 14. The gas pressure created forces the water down the tube, the amount of water thus displaced is by-passed through the by-pass duct 12 into the lower portion of the pneumatic equalizing chamber C, whereby the trapped air in said chamber is compressed. When the water in the gas generating tube 14 is forced down and the tube is completely filled with gas, the carbide drops into the coolest portion of the water in chamber B at the lower end of the tube and the gas rises and accumulates in the top of chamber B, causing further displacement of water through by-pass 12 resulting in further compression of the trapped air in chamber C until gas pressure in chamber B equals that in the control and safety valve tank 81. The gas pressure in chamber B then raises diaphragm 87 and allows the balance of water displaced by gas to escape through outlet 85, until the water level in chamber B is lowered so that floats 37 close master feed valve 52. Gas generation is then stopped automatically until sufficient gas is used in service to slightly reduce the gas pressure in chamber B, causing water level to again lower floats 37 and open the master feed valve F. The use of gas in service causes the rotation of the feed plate 18 automatically so that when master feed valve F opens the rotation feed element also operates to drop the carbide evenly from hopper E into the water in the gas generating tube. The diaphragm 87 automatically closes outlet 85 as soon as pressure in chamber B is reduced slightly lower than pressure in tank 81. The generator will function to generate gas automatically in proportion to the amount of gas used in service and maintain the desired pressure at which it is adjusted to operate.

The flow of carbide from charging hopper D into feed hopper E can be observed through the sight tube 13 and when ceasing to flow can be recharged by removing the filling cap 19 and sealing cap 30. The removal of the sealing cap automatically releases valve 22 which closes and seals hopper E from the admission of air while hopper D is being recharged. After feed hopper D has been refilled with carbide and the filling cap secured in place the sealing cap is replaced thus automatically opening valve 22 and allowing the carbide to flow into the feed hopper.

The operation of the carbide feed can from time to time be observed through the sight tube 15. The gas flowing through the feed motor causes the feed of carbide automatically and as the gas thus functions it is washed by the liquid in the rotor tank and then cleaned by the scrubber.

The valve 60 remains closed at all times unless a leak should develop in the mechanism above tank A and gas generating tube 14 in which event if the pressure of gas in the generating tube is lowered the pressure on diaphragm 60 is relieved proportionately and any excess pressure in chamber B raises the diaphragm and allows pressure in chamber B and generating tube 14 to balance. The water in tube 14 and the generating chamber B will then stand at the same level.

The heat control remains inoperative until the temperature of water in the generator influences the thermostat which in turn causes the by-pass valve 69 to allow water of lower temperature to enter the compression chamber C, the hot water in the generating chamber B being forced out through duct 85 of the heat control and safety valve automatically without interrupting the generation of gas in the machine.

The removal of sludge is accomplished by partially opening valve 86 until a flow of water starts out of outlet 85. The sludge valve 101 is then opened and pressure of gas in the generator forces the sludge through valve opening 100. Valve 66 is opened in proportion to opening of valve 86 so as not to reduce water level which in turn would lower the pressure. To transfer sludge from the outer edge to center outlet the handle 109 is revolved slowly and the arm 104 is moved over the surface of the floor 12. To drain the lower chamber C when desired the valved duct 112 is opened.

It is not necessary within the spirit of my invention to employ an opposing compression chamber and interconnecting by-pass duct, nor is it necessary to operate the carbide supply master valve by float controlled means as described above. In Figs. 8 to 11 inclusive I have shown a single water container J formed by an air excluding tank in which water under the desired pressure is fed from a supply duct 115 and maintained at constant level in the water chamber by a float 116, which through the action of a lever 117 opens and closes an intake valve 118. Surplus water in the water chamber is permitted to egress through an outlet 119 which is tapped into the chamber at the working level of water and is controlled by valve 120, the latter being also operated by the action of the work arm of the lever 117 which is reciprocated between the stems of the two valves 118 and 120.

The carbide hoppers D and E, downwardly extending gas generating tube 14, master valve actuated by the reciprocation of the thrust rod 32, feed mechanism actuated by the gas propelled motor G and scrubber H may be similar to the construction described above. The heat control functions in the same manner as described above the diaphragm actuated valve 69 being actuated by the thermostat 67 to control the inlet and outlet water supply ducts 71 and 72 as above described to by-pass water of reduced temperature into the water chamber in case of an excessive rise in temperature of the water, in which event there would be a rise in level of the water in the chamber checked by the opening of the egress valve 120 through the action of float 116.

In this alternative construction the supply carbide master valve F cooperates with the automatic motor propelled feed employed in the construction described above to automatically drop carbide into or upon the water in or at the lower end of the gas generating tube and generate gas in the water container, said valve being actuated by the valve rod 32. This valve rod is operated by a suitable lever such as 121, which is fulcrumed on the support 122. The power arm of said lever is connected by a rod 123 to a spring cushioned coupling 124 which in turn is attached to the reciprocable propeller 125 (see Fig. 9) of a controlling diaphragm 126. The diaphragm 126 is mounted across the lower end of a water receptacle 127 thus dividing the receptacle into lower and upper compartments 128 and 129. The lower compartment is connected by duct 130 (see Fig. 8) with the upper portion of water container J to contact gas generated in container J and the upper compartment 129 of receptacle 127 is occupied by a column of water above the diaphragm 126 to the desired pressure it is desired to generate gas in container J as indicated by the gauge 132. If the pressure of gas generated exceeds the desired pressure a release valve 133 opens automatically against the tension of a coil spring 134 and allows excessive pressure of gas to pass outside until pressure on the under side of the diaphragm is lowered sufficient to allow the diaphragm to return to neutral position. A lever 135 fulcrumed in the housing of the diaphragm has its power end playing freely between the diaphragm actuating plate 125 and a pair of nuts 136 on the connecting rod 123 and its work end playing freely on the release valve 133, whereby the release valve is actuated in the manner stated. With this feed control it is impossible to feed carbide while the release or safety valve is open. In this construction the diaphragm 126 is balanced by opposed pressure of the gas within the generator and the column of liquid in chamber 129 and any excessive pressure released. Also the feed of carbide is directly proportional to the amount of gas used and the level of water is controlled automatically. This construction having a single gas unopposed generating chamber contains the essential features of the preferred construction set forth above and is particularly applicable for small portable gas generating units having a somewhat lower production cost than the larger units employing opposed compression chambers.

The sludge remover in this single chamber type of my improvement is shown of slightly modified form, the floor 137 of the gas generating chamber J being of dome shaped and the valved outlet 138 of usual type provided at the lower portion of the chamber. The rotary wiper arm 139 for loosening the sludge and directing it downwardly and outwardly is a flexible blade journaled at 140 near the top of the dome floor and is shown operated by the rotary shaft 141 and handle 142.

In accordance with the patent statutes, I have described the principles of operation of my invention together with the construction thereof which I now consider to represent the best embodiment thereof but I desire to have it understood that the construction shown is only illustrative and that the invention can be carried out by other means and applied to uses other than those above set forth within the scope of the following claims.

I claim:

1. In an acetylene generator, the combination of a liquid container sealed to exclude air and form a gas chamber above liquid therein and having a gas generating tube depending into the lower portion thereof, a carbide feed hopper having a feed duct entering said tube, a valve controlling said duct, means actuated by the level of liquid in said container for operating said valve, a feed element below said valve, and means operable by the flow of gas from said container for actuating said feed element and regulating the supply of carbide to said tube.

2. In an acetylene generator, the combination of a liquid container sealed to exclude air and form a gas chamber above liquid therein and having a gas generating tube depending into the lower portion thereof, a carbide feed hopper having a duct entering said tube, a valve controlling said duct, means actuated by the level of liquid in said container for operating said valve to release carbide from the hopper, a rotary feed table below said valve upon which carbide is released by the valve and by which carbide is fed into liquid contained in said tube, and means operable by the flow of gas from said container for rotating said table to feed carbide in direct proportion to the amount of gas consumed from the said container.

3. In an acetylene generator, the combination of a liquid container sealed to exclude air and form a gas chamber above liquid therein and having a gas generating tube depending into the lower portion thereof, a carbide feed hopper having an orifice above said tube, a valve controlling said orifice, means actuated by the level of liquid in said container for operating said valve to release carbide from the hopper according to the level of liquid in said container, a transparent duct connecting said hopper with said tube, a rotary feed table visible in said duct and below said valve by which carbide is fed into liquid in said tube, and means operable by the flow of gas from said container for rotating said table to feed carbide into the tube in direct proportion to the flow of gas from the container.

4. In an acetylene generator, the combination of a liquid container sealed to exclude air and form a gas chamber above liquid therein and having a gas generating tube depending into the lower portion thereof, a carbide feed hopper having an orifice above said tube, a valve movable upwardly to open said orifice, float actuated means for operating said valve to release carbide from the hopper according to the level of liquid in said container, a duct connecting said hopper with said tube, a rotary feed table in said duct below said valve by which carbide is fed into liquid in said tube, and a gas turbine having a rotor actuated by the flow of gas from the container and connected with said table to revolve the latter in direct proportion to said flow of gas.

5. In an acetylene generator, the combination of a liquid container sealed to exclude air and form a gas chamber above liquid therein, a carbide feed hopper mounted upon said container, means for feeding carbide from the hopper into said container, a carbide charging hopper mounted upon the feed hopper and having a filling opening in its upper portion and an outlet duct in its lower portion entering the feed hopper and forming a valve seat, a spring pressed charging valve normally urged upwardly to close upon said seat and depressible downwardly into open position to permit the transfer of carbide from the charging hopper into the feed hopper, and a removable closure in said filling opening adapted when inserted to depress said valve into open position and when removed to release the valve into closed position and prevent the escape of gas from the feed hopper.

6. In an acetylene generator, the combination of a liquid container sealed to exclude air and form a gas chamber above liquid therein, a carbide feed hopper mounted upon said container, means for feeding carbide from the hopper into said container, a carbide charging hopper mounted upon the feed hopper and having an outlet duct in its lower portion entering the feed hopper and forming a valve seat and a filling opening in its upper portion, a spring pressed charging valve normally urged upwardly to close upon said seat and depressible into open position to permit the transfer of carbide from the charging hopper into the feed hopper, said valve having an upwardly extending stem, a spring threaded over said stem and normally urging the valve upwardly into closed position and a removable sealing closure in said filling opening adapted when inserted to contact said stem and depress said valve into open position and when removed to release the valve into closed position and prevent the escape of gas from the feed hopper.

7. In an acetylene generator, the combination of a liquid container sealed to exclude air and form a gas chamber above liquid therein, a carbide feed hopper mounted upon said container, means for feeding carbide from the hopper into said container, a carbide charging hopper mounted upon the feed hopper and having a filling opening in its upper portion and an outlet duct in its lower portion entering the feed hopper, a spring pressed charging valve normally urged upwardly to close upon said seat and depressible into open position to permit the transfer of carbide from the charging hopper into the feed hopper, said valve having an operating element terminating in juxtaposition to said filling opening, and means simultaneously closing said filling opening and depressing said operating element for opening said valve.

8. In an acetylene generator, the combination of a liquid container sealed to exclude air and form a gas chamber above liquid therein, a carbide feed hopper mounted upon said container, means for feeding carbide from the hopper into said container, a carbide charging hopper mounted above the feed hopper having a filling opening in its upper portion and an orifice in its lower portion communicating with the feed hopper and forming a valve seat, a transparent duct between said hoppers and surrounding said valve seat, a charging valve visible through the wall of said duct and normally urged upwardly to close upon said seat, said valve being depressible downwardly into open position to permit the transfer of carbide from the charging hopper into the feed hopper and having an operating element terminating in proximity to said filling opening and a removable closure for said filling opening adapted in closed position to impress said operating element and open said valve and when removed to release said valve into closed position.

DAVID F. GEIGER.